(12) United States Patent
Kudrna et al.

(10) Patent No.: US 8,978,355 B2
(45) Date of Patent: Mar. 17, 2015

(54) VARIABLE RATE IGNITION

(75) Inventors: Richard Robert Kudrna, Greenfield Park (CA); Danielle Methot, Boucherville (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 388 days.

(21) Appl. No.: 11/946,944

(22) Filed: Nov. 29, 2007

(65) Prior Publication Data

US 2008/0071461 A1    Mar. 20, 2008

Related U.S. Application Data

(62) Division of application No. 11/019,636, filed on Dec. 23, 2004, now Pat. No. 7,322,197.

(51) Int. Cl.
| | | |
|---|---|---|
| *F02C 7/264* | (2006.01) | |
| *F02G 1/055* | (2006.01) | |
| *F02G 3/00* | (2006.01) | |
| *F02P 15/00* | (2006.01) | |
| *F02C 7/266* | (2006.01) | |
| *F02P 9/00* | (2006.01) | |

(52) U.S. Cl.
CPC .............. *F02P 15/003* (2013.01); *F02C 7/264* (2013.01); *F02C 7/266* (2013.01); *F02P 9/002* (2013.01); *F05D 2270/303* (2013.01); *F05D 2270/301* (2013.01)
USPC .......... 60/39.821; 60/39.827; 60/776; 60/786

(58) Field of Classification Search
USPC ............................ 60/39.821, 39.827, 776, 786
See application file for complete search history.

(56) References Cited

U.S. PATENT DOCUMENTS

| 4,414,804 | A | * | 11/1983 | Menard et al. .................. 60/786 |
|---|---|---|---|---|
| 5,091,858 | A | | 2/1992 | Paielli |
| 5,150,300 | A | | 9/1992 | Danno et al. |
| 5,165,223 | A | * | 11/1992 | Ingham et al. .................. 60/778 |
| 6,353,293 | B1 | * | 3/2002 | Frus et al. ................. 315/209 R |
| 7,322,197 | B2 | | 1/2008 | Kudrna et al. |

(Continued)

FOREIGN PATENT DOCUMENTS

| EP | 0789144 A2 | 8/1997 |
|---|---|---|
| EP | 1607622 A2 | 12/2005 |
| EP | 1607622 A2 | 12/2005 |

OTHER PUBLICATIONS

Supplementary European Search Report, EP 05784338, The Hague, Aug. 19, 2010, Herbiet, J.
Canadian Intellectual Property Office; Response to Examiner's Requisition dated Mar. 11, 2013.
Canadian Intellectual Property Office; Examiners Requisition dated Sep. 13, 2012.

(Continued)

*Primary Examiner* — Craig Kim
(74) *Attorney, Agent, or Firm* — Norton Rose Fulbright Canada LLP

(57) ABSTRACT

Variable rate ignition method and system that take advantage of knowledge and analysis of environmental conditions and/or operational conditions. A variable ignition rate for igniting the engine permits an optimal use of the igniters and thereby prolongs their life as well as its associated maintenance schedule. Operating costs and durability are also enhanced. Furthermore, flexibility is enhanced since any changes to the method of determining the best spark rate can be made through update in the software of the engine controller instead of change in the hardware (e.g., the exciter).

13 Claims, 2 Drawing Sheets

(56) References Cited

U.S. PATENT DOCUMENTS

2005/0276000 A1  12/2005  Wilmot et al.
2006/0037326 A1* 2/2006  Mehrer et al. .................. 60/776

OTHER PUBLICATIONS

Canadian Intellectual Property Office; Notice of Allowance dated May 3, 2013.

* cited by examiner

VARIABLE RATE IGNITION

CROSS-REFERENCE TO RELATED APPLICATION

The present application is a divisional application of allowed application Ser. No. 11/019,636, filed on Dec. 23, 2004 now U.S. Pat. No. 7,322,197 which is hereby incorporated by reference and from which the present application claims priority under 35 USC 121.

TECHNICAL FIELD

The present invention relates generally to ignition systems and method for gas turbine engines.

BACKGROUND OF THE ART

Prior art ignition exciters normally have fixed spark rates. These fixed spark rates are designed for an extreme point in the operating envelope of an engine. In order to accommodate this extreme requirement, the exciter has to be set to fire at the fastest rate at all times. This situation has the disadvantage of unduly inducing wear on spark igniters as well as reducing their lives. This results in having to replace igniters earlier than necessary and thereby increases already expensive engine maintenance costs. The stresses associated to the greater number of generated sparks/impulses also results in low durability and high operating costs for conventional exciters.

Furthermore, systems exist where two or more fixed spark rates are manually selected according to the stage of operation. These systems provide limited flexibility.

SUMMARY OF THE INVENTION

One aspect of the present invention provides an improved variable rate ignition method and apparatus.

In the present invention, the decision process for determining the spark rate of the igniter is entirely ensured by the engine controller. The exciter makes no decision and fires only upon receiving a signal from the engine controller. The engine controller therefore powers the exciter which in turn fires the igniter. This results in a simplification of the design of the exciter.

The present invention also simplifies engine installation. For a typical engine, the wire cable length between the electronic controller and the APU and exciter is approximately 22 meters. Each wire adds considerable weight and cost. The arrangement presented herein requires only two wires while conventional installations require four (i.e., two for power and two for control).

Also, the present invention provides a variable rate ignition method that takes advantage of knowledge and analysis of environmental conditions and/or operational conditions A variable ignition rate for igniting the engine permits an optimal use of the igniters and thereby prolongs their life as well as its associated maintenance schedule. Furthermore, flexibility is enhanced since any changes to the method of determining the best spark rate can be made through update in the software of the engine controller instead of change in the hardware (e.g., the exciter).

According to an embodiment, there is provided a system for igniting a flow of fuel to a gas turbine engine. The system comprises: an engine controller to gather information on at least one of an environmental condition and an operating condition to select a desired spark rate based on the gathered information; an exciter producing a spark impulse to command an igniter, the spark impulse being produced in response to the selected spark rate, the exciter being separate from the engine controller; and an igniter to ignite the flow of fuel.

According to an embodiment, there is provided an engine controller for determining a desired spark rate used in igniting a flow of fuel to a gas turbine engine, the flow of fuel for being ignited by an igniter which in turn is for being commanded by a spark impulse produced by an exciter, the engine controller comprising: an input for gathering information on at least one of an environmental condition and an operating condition; means for selecting a desired spark rate based on the gathered information; and the engine controller being separate from the exciter.

Further details of these and other aspects of the present invention will be apparent from the detailed description and Figures included below.

DESCRIPTION OF THE DRAWINGS

Reference is now made to the accompanying Figures depicting aspects of the present invention, in which.

DETAILED DESCRIPTION OF PREFERRED EMBODIMENTS

Figure 1:
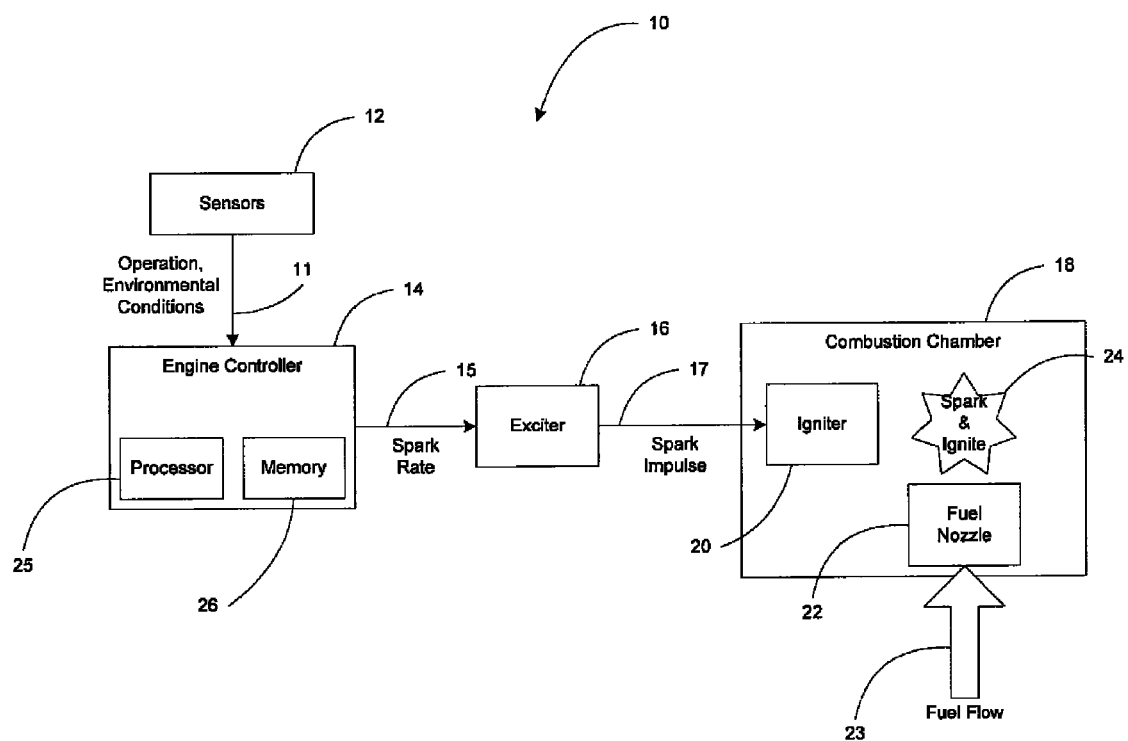
FIG. 1 is a block diagram of a variable rate ignition system according to an embodiment of the invention.

Referring to FIG. 1, there is shown a variable rate ignition system 10 according to an embodiment of the invention. System 10 includes Sensors 12, Engine Controller 14, Exciter 16, Igniter 20 and Fuel Nozzle 22. Igniter 20 and Fuel Nozzle 22 are included in Combustion Chamber 18 of a Gas Turbine Engine (GTE) (not shown).

It is foreseen that the present system 10 may be incorporated in any type of GTE installed, for example, aboard aircraft. System 10 may also be installed in any type of Auxiliary Power Units (APU). In aircraft GTEs, Engine Controller 14 is more commonly known as an Electronic Engine Controller (EEC) while in APUs it is referred to as an Engine Controller Box (ECB).

Sensors 12 are off-the-shelf items which are normally found in GTEs or APUS and are capable of sensing Environmental and/or Operational Conditions 11. Examples of such Environmental and/or Operational Conditions 11 include temperature of inlet air, engine oil, fuel, the exciter and exhaust gases. Other examples include pressure of ambient air, fuel and oil.

By examining this information, the Operational Conditions 11 can be determined. For example, a sea level, artic condition, cold soak condition is characterized by cold air, oil and fuel, with atmospheric pressure at approximately 1 Bar. A sea level, arctic condition start of a non cold soaked engine (e.g., recently running and still warm), would differ in that oil and fuel temperature would be above ambient. The latter set of condition would require a slower spark rate than the former.

Engine Controller 14 further includes Processor 25 and Memory 26. An appropriate Processor 25 and Memory 26 may be selected from those known by those skilled in the art. It was found that Processor 25 such as those made by Texas Instruments, IBM and Motorola work well. Processor is meant to include microprocessors, micro controllers, embedded controllers, DSPs and ASICs. An example of a specific micro controller is the Motorola MPC555. As for Memory 26, those made by AMD, INTERSIL and ZILOG are appropriate. Memory 26 types may include EEPROMs (Electrically Erasable and Programmable Read Only Memory). Engine Controller 14 provides Desired Spark Rate 14 which is used by Exciter 16 to produce Spark impulse 17.

Compatible Igniter 20 and Fuel Nozzle 22 may be selected off-the-shelf by to those skilled in the art. Igniter 20 receives Spark impulse 17 and provides a spark 24 to light a fuel spray from Fuel Nozzle 22 receiving Fuel Flow 23.

Figure 2:
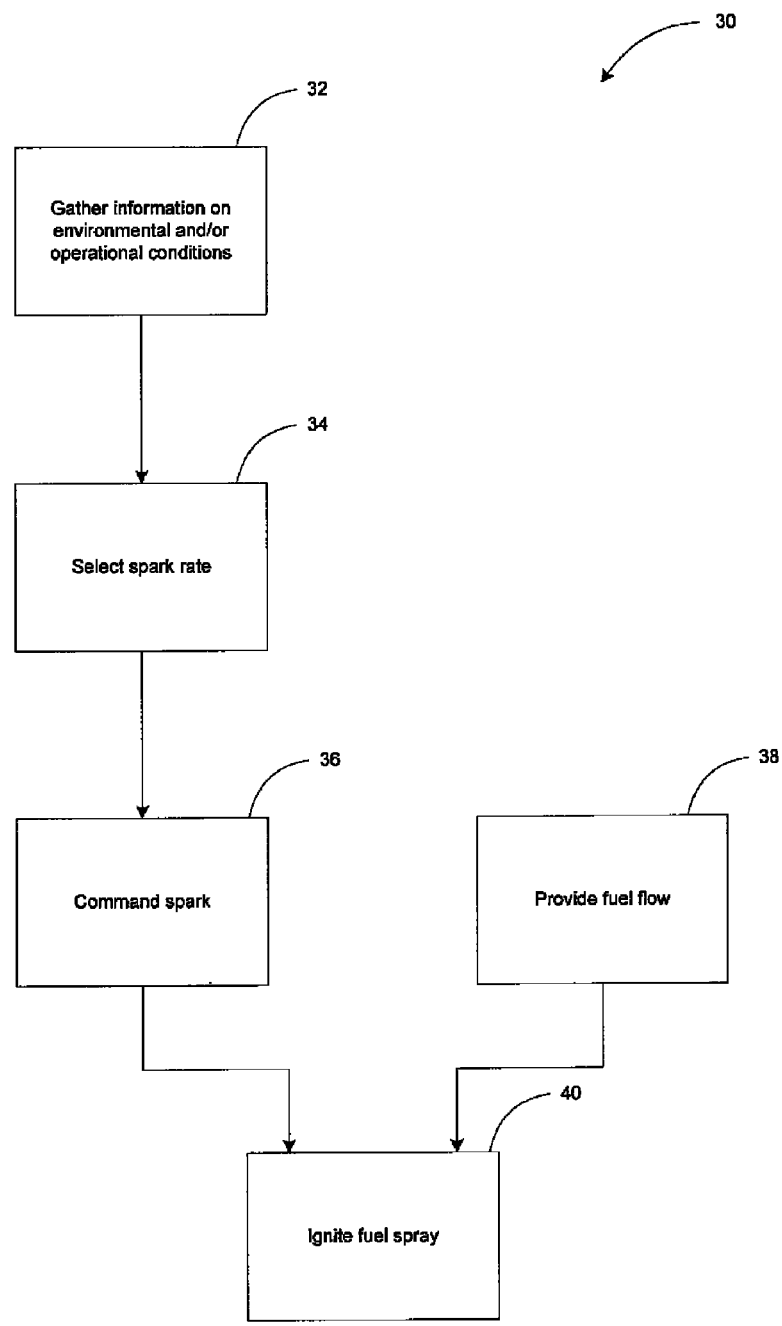
FIG. 2 is a flow chart of a variable rate ignition method according to an embodiment of the invention.

The operation of System 10 is described in more detail along with Method 30 shown in FIG. 2. Method 30 starts with the gathering of Environmental and/or Operational Conditions 11 (step 32) by Sensors 12.

The Environmental and/or Operational Conditions 11 are then used to select Desired Spark Rate 15. Environmental and/or Operational Conditions 11 may be fed directly to a program being run by Processor 25 or stored in Memory 26 to be processed later. The program itself may be stored in Memory 26. The program calculates Desired Spark Rate 15 based on Environmental and/or operational Conditions 11.

Another method for selecting Desired Spark Rate 15 is to use a look up table stored in Memory 11. The look up table may simply include Environmental and/or Operational Conditions 11 and their corresponding given spark rates. The given spark rate corresponding to the present Environmental and/or Operational Conditions 11 is the Desired Spark Rate 15.

Desired Spark Rate 15 is then used to command a spark to an Igniter 20 (step 36). A fuel flow is also provided (step 38), and an ignition in Combustion Chamber 18 of an engine takes place.

It is noted that the fuel flow is also typically determined by the Engine Controller 14 after evaluating environmental and operating conditions. Engine start flows typically vary with inlet air temperatures and pressure, and engine fluid temperatures.

The above description is meant to be exemplary only, and one skilled in the art will recognize that further changes may be made to the embodiments described without departing from the scope of the invention disclosed. Still other modifications will be apparent to those skilled in the art, in light of a review of this disclosure, and such modifications are intended to fall within the appended claims.

We claim:

1. A system for igniting a flow of fuel to a gas turbine engine, the system comprising:
    an igniter configured to ignite the flow of fuel according to a variable spark rate;
    an exciter configured to produce a spark impulse to command the igniter to ignite the flow of fuel according to a desired spark rate; and
    an engine controller configured to gather information on an environmental condition and an operating condition including a temperature of the exciter, and select the desired spark rate for the igniter based on the gathered information on the temperature of the exciter, wherein the exciter is separate from the engine controller.

2. The system of claim 1, wherein the controller comprises a memory storing a program for calculating the desired spark rate using the at least one of an environmental condition and an operating condition.

3. The system of claim 2, wherein the controller comprises a processor configured to use the program to calculate the desired spark rate.

4. The system of claim 1, wherein the controller comprises a memory storing a table of the at least one of an environmental condition and an operating condition each corresponding to a given spark rate.

5. The system of claim 4, wherein the controller comprises a processor configured to look up the table to obtain the desired spark rate.

6. The system of claim 1, wherein the gathered information comprises at least one of engine oil temperature, exhaust gas temperature and ambient air pressure.

7. The system of claim 6, further comprising a sensor configured to detect the gathered information.

8. An engine controller for determining a desired spark rate used in igniting a flow of fuel to a gas turbine engine, the flow of fuel for being ignited by an igniter which in turn is for being commanded by a spark impulse produced by an exciter, the engine controller comprising:
    an input for gathering information on a temperature of the exciter; and
    means for selecting the desired spark rate based on the gathered information;
    wherein the engine controller is separate from the exciter.

9. The engine controller of claim 8, further comprising a memory for storing a program for calculating the desired spark rate using the temperature of the exciter.

10. The engine controller of claim 9, further comprising a processor for using the program to calculate the desired spark rate.

11. The engine controller of claim 8, further comprising a memory for storing a table of the temperature of the exciter and a corresponding given spark rate.

12. The engine controller of claim 11, further comprising a processor for looking up the table to obtain the desired spark rate.

13. The engine controller of claim 8, wherein the input is configured to gather information on at least one of engine oil temperature, exhaust gas temperature and ambient air pressure.

* * * * *